US011090757B2

(12) United States Patent
Pasquale

(10) Patent No.: US 11,090,757 B2
(45) Date of Patent: Aug. 17, 2021

(54) ELECTROMAGNETIC PULSE WELDING COIL WITH EXCHANGEABLE CONDUCTOR

(71) Applicant: PSTproducts GmbH, Alzenau (DE)

(72) Inventor: Pablo Pasquale, Alzenau (DE)

(73) Assignee: PST PRODUCTS GMBH, Alzenau (DE)

(*) Notice: Subject to any disclaimer, the term of this patent is extended or adjusted under 35 U.S.C. 154(b) by 0 days.

(21) Appl. No.: 16/650,063

(22) PCT Filed: Sep. 7, 2018

(86) PCT No.: PCT/DE2018/100764
§ 371 (c)(1),
(2) Date: Mar. 24, 2020

(87) PCT Pub. No.: WO2019/063038
PCT Pub. Date: Apr. 4, 2019

(65) Prior Publication Data
US 2020/0290147 A1    Sep. 17, 2020

(30) Foreign Application Priority Data
Sep. 26, 2017 (DE) .................. 10 2017 122 229.4

(51) Int. Cl.
*B23K 20/06* (2006.01)
*H05B 6/10* (2006.01)
(Continued)

(52) U.S. Cl.
CPC ............. *B23K 20/06* (2013.01); *H05B 6/101* (2013.01); *H05B 6/36* (2013.01); *H05B 6/44* (2013.01)

(58) Field of Classification Search
CPC ... B23K 20/06; H01F 27/2847; H01F 38/085; H05B 6/101; H05B 6/36; H05B 6/44
(Continued)

(56) References Cited

U.S. PATENT DOCUMENTS 2,066,668 A * 1/1937 Bennett .................. H05B 6/362
219/50
3,851,139 A * 11/1974 Rudd .................... B23K 13/02
219/101
(Continued)

FOREIGN PATENT DOCUMENTS

DE    102011010216 A1    8/2012
EP       2670554 B1       5/2017
(Continued)

OTHER PUBLICATIONS

English Translation of the International Search Report for International Application No. PCT/DE2018/100764, dated Jan. 11, 2019.
(Continued)

*Primary Examiner* — Dana Ross
*Assistant Examiner* — Ket D Dang
(74) *Attorney, Agent, or Firm* — Brian D. Kaul; Westman, Champlin & Koehler, P.A.

(57) ABSTRACT

An electromagnetic pulse welding coil includes a first conductive region and a second conductive region. The second conductive region is assigned to a remainder of the coil and has a low current density. The first conductive region is configured for generating a higher current density than the second conductive region. The first conductive region is detachably connected to the remainder of the coil using a detachable connection. The electromagnetic pulse welding coils is planar in design and is cut out of a metal plate.

15 Claims, 2 Drawing Sheets

(51) Int. Cl.
H05B 6/36 (2006.01)
H05B 6/44 (2006.01)

(58) Field of Classification Search
USPC ....... 219/617, 603, 602, 607, 608, 610, 611, 219/614–616, 659, 101, 149, 152, 153, 219/59.1, 61.2, 67; 228/114.5, 232, 228/262.5; 285/288.1, 21.2, 41; 257/687
See application file for complete search history.

(56) References Cited

U.S. PATENT DOCUMENTS

| 9,636,771 | B2 | 5/2017 | Pasquale | |
| 2013/0299487 | A1* | 11/2013 | Pasquale | H05B 6/36 219/603 |
| 2017/0291252 | A1* | 10/2017 | Avrillaud | H05B 6/06 |

FOREIGN PATENT DOCUMENTS

| JP | 2004342535 | | 12/2004 |
| JP | 2010110814 | | 5/2010 |
| JP | 2012152821 | A | 8/2012 |
| WO | 2019063038 | A1 | 4/2019 |

OTHER PUBLICATIONS

Written Opinion of the International Searching Authority for International Application No. PCT/DE2018/100764, filed Sep. 7, 2018.
Oleg Zaitov et al, "Bitter coil design methodology for electromagnetic pulse metal processing techniques", Journal of Manufacturing Processes,Band 16, Nr. 4, Aug. 22, 2014 (Aug. 22, 2014), Seite 551-562, XP055536454.
English translation of the International Preliminary Report on Patentability for International Application No. PCT/DE2018/100764, dated Nov. 21, 2019.

* cited by examiner

ELECTROMAGNETIC PULSE WELDING COIL WITH EXCHANGEABLE CONDUCTOR

CROSS-REFERENCE TO RELATED APPLICATION

This application is a Section 371 National Stage Application of International Application No. PCT/DE2018/100764, filed Sep. 7, 2018 and published as WO 2019/063038 A1 on Apr. 4, 2019, in German, the contents of which are hereby incorporated by reference in their entirety.

FIELD

Embodiments of the present invention relate to an electromagnetic pulse welding coil, comprising a region of high current density and a remainder of the coil with at least one region of low current density, as well as a method for prolonging the lifetime of such a coil.

BACKGROUND

Electromagnetic pulse forming/welding is a forming and/or welding process for metal workpieces, in which strong, time-variable magnetic fields induce high eddy currents in the workpiece that is to be processed, at the desired locations that are to be formed, wherein, due to the coupling of the eddy currents to these inductive fields, a high force is exerted on the region of the workpiece that is to be formed. According to the well-known Lenz's law, this force is directed away from the generating source. Its strength is, on one hand, proportional to the field strength of the inducing magnetic field and, on the other hand, additionally proportional to the change of this field strength with time.

In the prior art, it is known to generate this magnetic field used for forming by means of planar coils having two mutually adjacent windings, which are energized with a time-varying, usually sinusoidal current flow. In order to reach the desired high field strengths, on one hand, and, on the other, to obtain a clearly defined region of the forming, these coils are shaped such that they comprise at least one, narrow bridge, which, when connected in series with regions of wider cross-section, effects a concentration of the current flow and thus leads to a high current density in the region of the bridge. Such coils are consistently designated "pulse welding coils" below, although they are generally just as suitable for pure forming of a workpiece. The field strength of the magnetic field that eventually leads to forming, as well as its variation over time, are directly proportional to this current density, and consequently the force acting on the workpiece scales with the square of the current density amplitude. Correspondingly, in the design of pulse welding coils, the effort is made to use bridges that are as narrow as possible.

In contrast, however, there is the fact that the material of the coil is also subject to high mechanical stresses due to the high current densities and thermal stresses, and due to the force reacting on the coil from the workpiece, which leads to rapid fatigue of the region loaded with high current density, that is to say the usually narrow bridges. This disadvantageously limits the lifetime of such pulse welding coils.

This problem has been long recognized in the prior art and solutions have been attempted through various measures. For example, the Japanese published application JP2004-342535A discloses a pulse welding coil in which the coil loaded with a high current density is embedded in a non-conducting structure which mechanically supports it, and can also be cooled by means of active cooling. However, a pulse welding coil designed in this way is very thick compared with the planar pulse welding coils, which are usually preferred, and is also complicated both to produce and to operate. The former because a mechanical supporting structure of non-conductive material must be formed around the actual pulse welding coil, and the latter since an active cooling system consisting of cooling fluid channels and circulation pump must be provided, connected, filled and, above all, maintained.

The published application JP2010/110814A proposes placing a pulse welding coil, which is known per se, for example from the Japanese published application JP 2012-152821 A, having a narrow coil bridge, which is disposed symmetrically between the regions of low current density, between two workpieces for processing at both sides. By this means, the forces that are applied to the coils, or to the coil bridge respectively, by the workpieces partially cancel one another out and a mechanical loading or even bending or the coil bridge is avoided or at least reduced. However, this cannot always be implemented, such as, for example, in the case in which only a single workpiece to be processed is present or in case a particular orientation of a workpiece that is to be formed, or of two workpieces that are to be joined to one another, is to be maintained.

The German published application DE 10 2011 010216 A1 as well as the European patent specification EP2670554B1 for the applicant describe planar pulse welding coils, in which the interspace between a coil bridge of narrow cross-section, which is loaded with high current density, and a coil part with larger cross-section, in which the current density is correspondingly lower, is filled with a cooling insulator. By this, an electrical insulator is meant, which, however, has a high thermal conductivity. Materials having such properties are, for example, boron nitride or aluminium nitride. With this design, it is advantageously achieved that the heat generated in the region loaded with high current density is dissipated by means of the highly thermally conductive material in the remainder of the coil. Furthermore, a mechanical connection is produced between the coil bridge and the remainder of the coil, so that the latter cannot be bent by the reactive forces acting from the workpiece. In contrast to the aforementioned solution with active cooling, a planar design of the coil can nevertheless be maintained.

Use of pulse welding coils for processing two workpieces simultaneously may be possible in individual applications, however, as already apparent from the examples mentioned above, it is not generally a solution for the problem of mechanical stressing of the narrow coil bridge. The solution proposed by the aforementioned patent specification is to be preferred to this, however has the disadvantage that, with the cooling insulator, a material that is difficult to process must be inserted into the pulse welding coil, which increases the manufacturing costs and time. Although the lifetime is prolonged to a higher degree than the manufacturing costs, there is still a need for a pulse welding coil that may have a planar design and is simple and cost-effective to manufacture, and nevertheless achieves a long effective lifetime.

Against this background, it is the object of embodiments of the present invention to provide such a pulse welding coil.

This object is achieved by means of an electromagnetic pulse welding coil, in which the regions loaded with a high current density, for example a coil bridge, are detachably connected to the remainder of the coil. By this means, it is possible to exchange the highly stressed regions when material fatigue or even material fracture occurs, and to continue using the remainder of the coil, which, corresponding to the significantly lower loads combined with size-dependent greater resilience, usually has a many times longer lifetime than the regions of high current density.

According to some embodiments, at least one exchangeable, that is to say detachably connected region, which is loaded with high current density, is present. However it is by all means possible, in a pulse welding coil that comprises a multiple of such regions, to design all regions such that they are exchangeable by means of detachable connections.

In the case of double-winding coils, which comprise two regions of the coil with large cross-section and correspondingly lower current density, this is usually U-shaped and symmetrical. In a plane of symmetry of the coil, a narrow coil bridge is located, which concentrates the current during a welding current pulse and in this way, at least section by section, achieves a high current density, and thereby field strength. Embodiments of the present invention now propose making this coil bridge exchangeable by connecting it in a detachable manner to the remainder of the coil. For this, on one hand, the use of connecting means comes into consideration, on the other hand also the detachable fastening by other means.

The former comprises, for example, fastening by means of screws or threaded bolts, which are introduced into recesses or bores, which are provided for this purpose, firstly in the region or coil bridge, which is loaded with high current density and, secondly, in the remainder of the coil and are fixed on the opposing side by means of a counter nut. Tightening of the nuts with the greatest possible torque ensures an areal contact between the conducting surfaces of the coil bridge and the remainder of the coil, which is very important for avoiding parasitic resistances at the high currents used in pulse welding.

As an alternative to a counternut, the thread of the screw or of the threaded bolt can also engage in a threaded hole introduced in either the remainder of the coil or in the coil bridge, the threaded bolt or the screw being first guided through that part, either the coil bridge or the remainder of the coil, that is not provided with an internal thread and is then screwed into the other part, which is equipped with an internal thread. Here, as with the use of a locknut, care must be taken to ensure as tight a fit as possible in order to establish areal contact.

Alternatively to, or jointly with the use of screws or threaded bolts, the part loaded with high current density, in particular the coil bridge, and the remainder of the coil can also be detachably connected by plugging together. To achieve the greatest possible area contact, embodiments of the present invention propose providing the remainder of the coil with a recess or depression that is complementary to a first end region of the coil bridge, which may extend over a substantial fraction of the length of the coil bridge.

The recess or depression can also have a cross-section that tapers in the plug-in direction of the coil bridge and, in conjunction with a cross-section of the first end of the coil bridge, which also tapers in a wedge shape towards the end, leads to a better frictional connection and a larger-area contact of the two parts with one another. This is especially the case if the recess is designed as a continuous opening in the remainder of the coil, which the coil web is plugged into from one side and after complete introduction, emerges again at the other side. Here, it can be fastened by means of a securing pin or bolt, which, if also designed in a wedge shape, leads to an increase of the contact pressure. Similarly, by the use of clamping jaws, the tensioning of the bridge can be influenced.

With the exception of the single-winding coil of the prior art, which, as described above, comprises two passive parts, which are normally symmetrical, with low current density and a narrow coil bridge, which is present in the coil in one symmetry, other designs are also conceivable, which can also benefit from the principle proposed by the present invention. An embodiment of this kind is a two-winding coil comprising two mirror-symmetrical partial coils, each partial coil comprising a region with larger lateral extension, that is to say width, and correspondingly low current density and a coil bridge that is parallel to the first region, with a small lateral extension or width and correspondingly high current density. The two partial coils are arranged such that their coil bridges are parallel at a small distance from one another and are electrically connected in series, joined to the pulse current generator, wherein it should be noted that the current in the two coil bridges flows in the same direction.

Compared to a single-winding coil, this complete system has the advantage that the coil-bridge cross-section can be further reduced and the current density can be correspondingly further increased, Furthermore, due to the distance between the coil bridges in the case of the workpiece that is disposed at a small distance above the coil bridge, the region with the highest eddy current density, which also undergoes acceleration, is more sharply delimited than in the case of a single-winding coil. By this means, it can be achieved that the workpiece to be deformed or welded to a counterpiece is processed at an apparently defined region than would be possible with a single-winding coil. By variation of the distance between the two partial coils, the width of the region to be deformed or weld seam can also be varied to a certain extent. According to embodiments of the invention, the coil web of each of the partial coils is detachably connected to the remainder of the partial coil, for example by one of the ways described above.

SUMMARY

One advantage of the electromagnetic pulse welding coil according to embodiments of the present invention apparently lies in the fact that the regions of highest current density, which are usually fatigued fastest during operation, and contribute to the low lifetime of the pulse welding coil, are exchangeable. It is therefore advantageously avoided that the coil as a whole needs to be replaced and can be reused, even if the remainder of the coil only has a lower current density and correspondingly has a much longer lifetime than the coil bridge. With the coil web, only a relatively small part, which is easy to manufacture, needs to be renewed, which saves material and costs. Moreover, an exchange of the coil bridge can also be performed significantly faster than an exchange of the entire coil, for which reason, for example, after a fatigue fracture of a coil bridge, the production only ceases for a shorter period of time than in the case of a conventional coil.

Advantageous embodiments of the invention that can be realised individually or in combination are described in greater detail below.

The pulse welding coil according to embodiments of the invention is planar in design, for example cut out of a metal sheet. The region of high current density can preferably be designed as a narrow bridge, which particularly preferably comprises a widened end region, with which it is detachably connected to the remainder of the coil. This increases the contact surface area, which, first, facilitates the transfer of current from the remainder of the coil into the coil bridge, in particular reduces the parasitic ohmic resistances, and, second, also improves the dissipation of the mechanical loads from the coil web into the remainder of the coil.

For detachable connection of the region loaded with high current density, in particular the coil bridge, embodiments of the present invention propose connecting this via a screw or plug connection to the remainder of the coil.

A screw connection by means of screws or threaded bolts can be produced in that they are is guided through one or more aligned apertures or bores in the coil web and the remainder of the coil, and fixed at the opposite side by means of a counter nut. It is also conceivable to provide the coil bridge, the remainder of the coil or both with threaded holes, into which the screws or threaded bolts are screwed. With this solution, it is preferred to screw the thread into the coil bridge, since then, with exchange of the coil bridge, the thread, which may have been damaged by tightening and reopening the threaded bolt, would also be exchanged.

A threaded hole introduced into the remainder of the coil, into which a bolt plugged through a bore in the bridge is screwed, is also conceivable. This solution offers the advantage that, on exchange of the coil bridge, the bolt can be introduced from above and the bridge can be laid on the remainder of the coil.

For fastening a coil bridge, more than one screw is preferably used.

Alternatively, it is preferred to plug the region that is loaded with high current density, in particular the coil bridge, into a recess that is complementary thereto or a continuous opening of the remainder of the coil. Particularly preferably the coil bridge is secured at a side lying opposite the insertion side by means of a securing pin or wedge, against accidental pulling or falling out and, with the use of a securing wedge, in conjunction with a cross-section of the coil bridge, which tapers in a wedge shape, and the opening in the remainder of the coil, which receives it, is connected with high contact pressure in the remainder of the coil.

For further reduction of parasitic ohmic resistances at the connection point between exchangeable regions of high current density and the remainder of the coil, a conductive paste or other means for enlarging the effective contact surface area can be inserted.

The coil according to embodiments of the invention can be mirror symmetrical. Preferably the remainder of the coil is designed as a U-shaped metal part with an essentially rectangular cross-section, of which the width at all points exceeds the breadth of the cross-section of the region that is loaded with high current density by a multiple, preferably by a factor of 3-1000.

Another preferred embodiment is a pulse welding coil in which only an L-shaped region of low current density is present, the region of high current density being detachably connected to the short leg, at the end region thereof, and runs parallel and adjacent to the longer leg.

To further increase the lifetime of the coil according to embodiments of the invention, it is proposed to design the cross-section both of the remainder of the coil, that is to say of the region of low current density and of the coupling region with the region of high current density or coil bridge, as well as to design the coil bridge such that the cross-section changes continually in the profile of the coil. Particularly preferable are cross-sectional changes in a continually differentiable manner. This means that in the profile of the coil, preferably no sudden changes in the dimensions of the cross-sectional area and particularly preferably also no bends are present. A possible and particularly preferable embodiment, which is comprised thereby, provides to design all the internal corners of the remainder of the coil and of the coil bridge rounded, the radius of curvature preferably corresponding approximately to a width of the coil bridge.

It is proposed to prolong the lifetime of the electromagnetic pulse welding coil according to embodiments of the invention with exchangeable coil bridge in that, for example, if the coil bridge is broken, or at least visibly deformed or fatigued, to detach and remove it from the remainder of the coil and to connect a newly provided, usually identical coil bridge to the remainder of the coil again. In particular those regions of the coil that are impacted by a high current density are subject to high wear. This applies in particular to the coil bridge. After this quick change of the coil bridge, the coil can continue to operate.

Further details and features of embodiments of the present invention are described in greater detail below with reference to the figures of exemplary embodiments. These are only intended to illustrate embodiments of the present invention, and in no way to limit its generality.

BRIEF DESCRIPTION OF THE DRAWINGS wherein.

DETAILED DESCRIPTION OF ILLUSTRATIVE EMBODIMENTS

Figure 1:
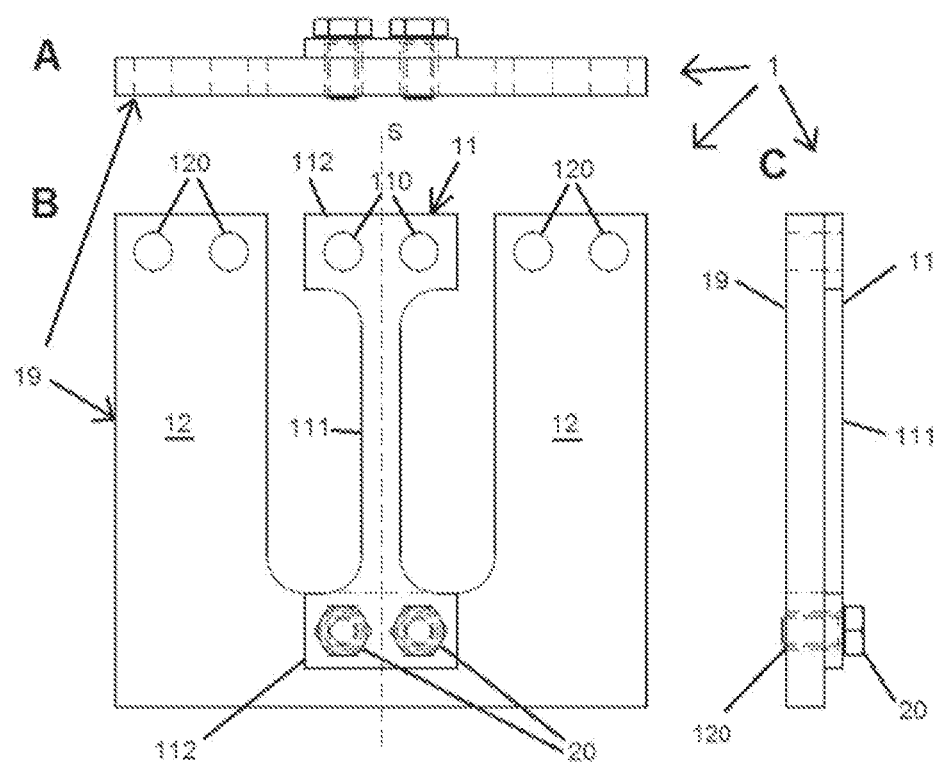
FIG. 1 shows a three-sided view of a first preferred embodiment of the pulse welding coil according to embodiments of the invention.

FIG. 1 shows in three-view a preferred embodiment of the pulse welding coil according to embodiments of the invention with a U-shaped region of low current density, to which, in one symmetry plane of the coil, a coil bridge with dumbbell-shaped outline is detachably fastened by means of threaded bolts at one of its two ends.

As in the top view shown in partial figure B, the exchangeable coil bridge 11 has a twofold mirror-symmetrical dumbbell-shaped outline with slim centre portion 111 and broader end plates 112. In each end plate 112, two bores 110 in each case are introduced. The remainder of the coil 19, comprising the two parts 12 which extend parallel to the coil bridge and are loaded with low current density, has a U-shaped outline of mirror-symmetrical design. At each end of the U-shaped legs, as well as at the vertex of the inner region, a pair of bores 120 in each case is introduced mirror-symmetrically to the plane of symmetry S.

The coil bridge 11 is detachably connected to the remainder of the coil 19, by placing the end plate 112 on the vertex region of the U-shaped inner region such that the bores 110 of the coil bridge 11 are aligned with the threaded holes 120 of the remainder of the coil 19, threaded bolts being plugged from above through bore 110 and screwed into the threaded holes 120. By this means, a pulse welding coil is obtained with two legs of large cross-section and a coil bridge of small cross-section, which is disposed centrally and symmetrically. The bores 110, which are introduced in the end plate 112, which faces away from the fastened end, serves for fastening the bridge with a pulse current source, as well as bores 120 in the end regions of the legs of the remainder of the coil 19. As can be seen in the side views in partial figures B and C, the coil bridge is mounted on the remainder of the coil and is therefore attached vertically offset thereon.

It would also be conceivable to introduce a step-shaped recess, which is complementary to the end plate 112, into the vertex region of the passive part 119, so that the coil bridge lies essentially in the same plane as the remainder of the coil. This has the advantage of a lower construction height of the complete coil, however it is associated with a higher manufacturing outlay for the passive part, and would also reduce the height of the threaded holes, whereby it is no longer possible to achieve such a high tightening force of the threaded bolts or screws, to which the coil bridge 11 with the remainder of the coil 19 is connected.

Figure 2:
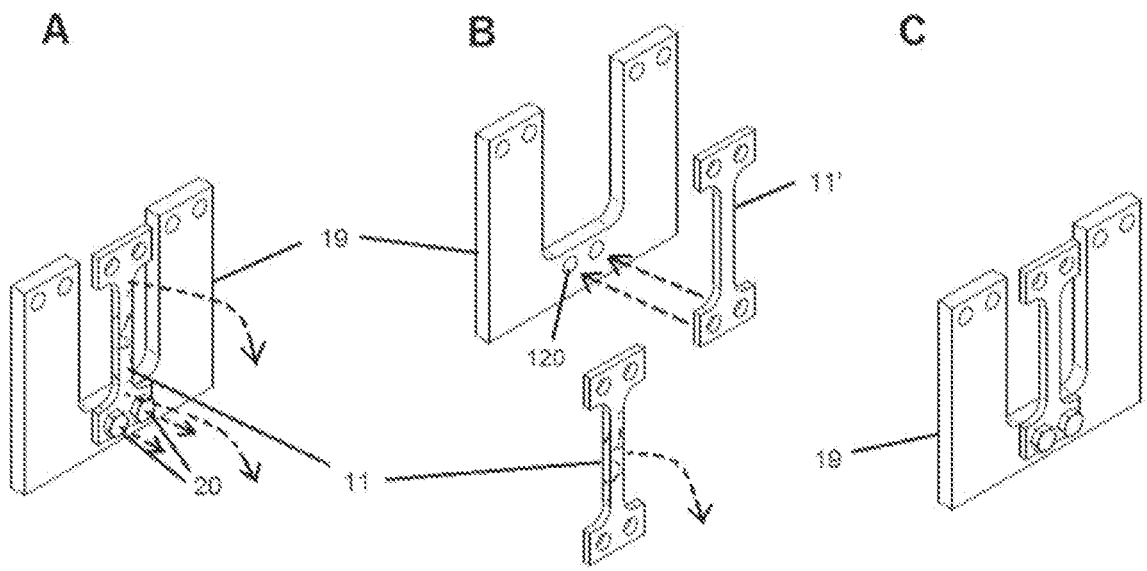
FIG. 2 shows the exchange of the coil bridge of the embodiment from FIG. 1.

The process of changing a coil bridge is illustrated in FIG. 2. Partial figure A shows a pulse welding coil according to embodiments of the invention with exchangeable coil bridge 11, which, as indicated, is to be exchanged due to material fatigue. To this end, the bolts 20 are released and the coil bridge 11 is removed (partial figure B).

A new coil bridge 11' is provided and placed with an end plate 112 on the vertex region of the U-shaped remainder of the coil 19 such that bores 110 are aligned with the threaded holes 120, as is indicated by the arrow in partial figure B, which points toward the remainder of the coil 19. Then the bolts 20 are plugged through the holes 110 in the threaded holes 120 and screwed tight. The exchange is thereby completed and the coil according to embodiments of the invention is available for further welding or forming work (partial figure C).

Figure 3:
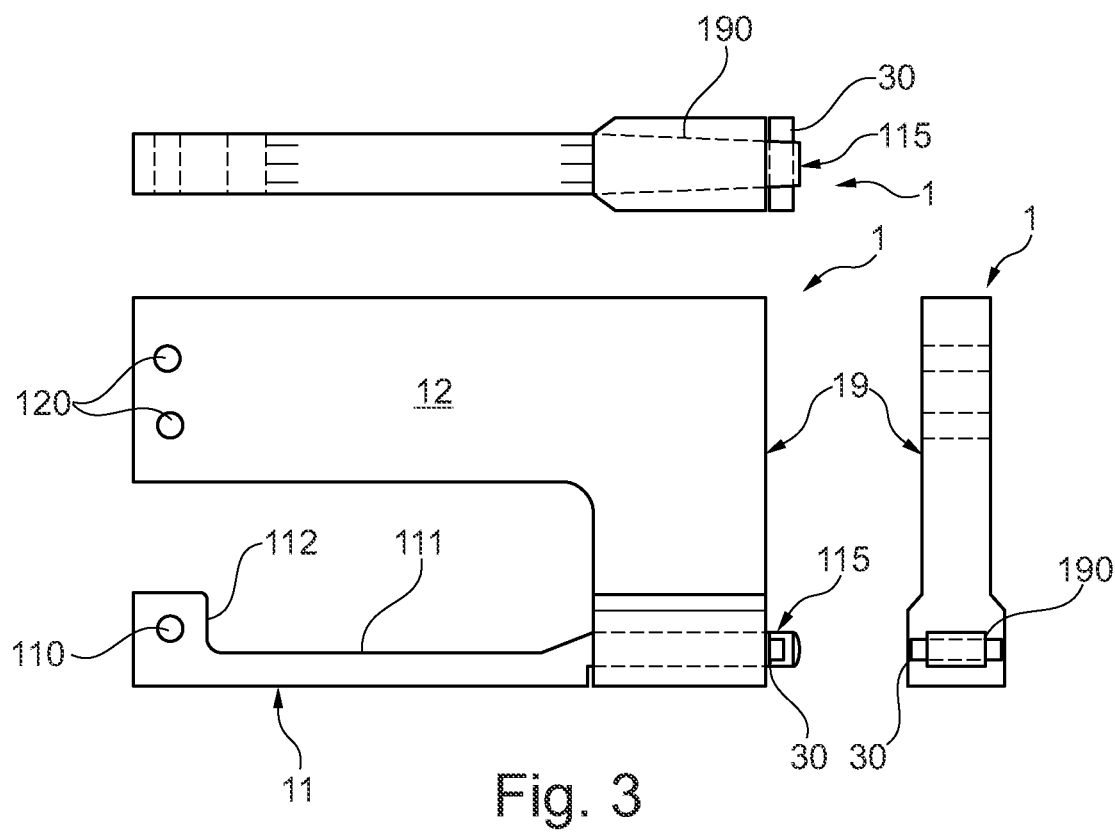
FIG. 3 shows a preferred embodiment of the pulse welding coil according to embodiments of the invention with L-shaped region of low current density, in which the coil bridge is fastened by means of a plug connection.

FIG. 3 shows a further preferred embodiment of the pulse welding coil in accordance with embodiments of the present invention. It consists of an L-shaped region of low current density 19 with a continuous recess 190, which is located in the shorter leg, and partially tapers from one end to the other, into which coil web 11 is plugged, which comprises at one end region an end region 115, which is complementary to the recess 190 and also tapers in a wedge shape. That end of bridge 11 that is opposite the tapering end region 115 comprises an end plate 112 with continuous bores 110 therein. At that end 115 of bridge 11 that is plugged into recess 190 there is located an opening 113, through which securing wedge 30 is plugged in order to secure bridge 11 against accidental sliding or falling out. However, securing wedge 30 furthermore serves the purpose of increasing the contact pressure and thereby the areal contact of region 115 against the inner wall of opening 190. The internal corner of the L-shaped region of the transition between the narrow center portion 111 and end plate 112, as well as the transition between the centre part and region 115 is rounded, the radius of curvature corresponding to approx. 10% of the length and approximately the width of the coil bridge.

Figure 4:
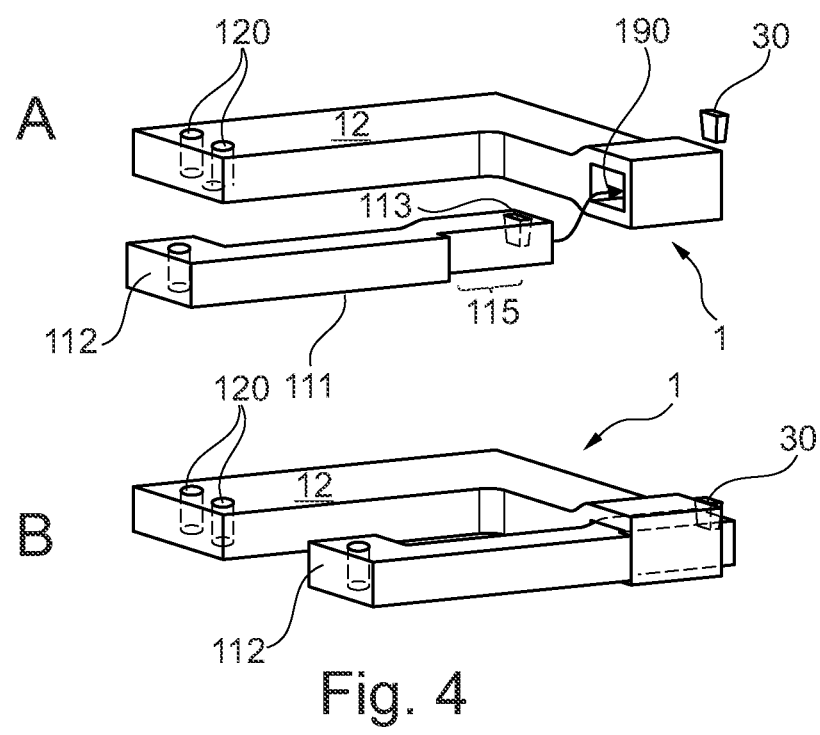
FIG. 4 shows the installation of the coil bridge in the embodiment of the coil according to embodiments of the invention shown in FIG. 3.

FIG. 4 shows in perspective view how the coil bridge 11 from the embodiment of FIG. 3 is inserted into the complementary opening 190 in the short leg of the L-shaped remainder of the coil 19. In partial figure A it is indicated how coil bridge 11 with the region 115 is introduced into the openings such that end region 115 completely engages through the opening 190. For securing the bridge 11, securing part 30 is plugged into the end, which projects from part 19 on the other side, into the opening 113 there, after which the final condition shown in partial figure B is achieved.

LIST OF REFERENCE CHARACTERS

| | |
|---|---|
| 1 | Pulse welding coil |
| 11 | Region of high current density, coil bridge |
| 110 | Bore |
| 111 | Bridge, narrow centre portion |
| 112 | Widened end region |
| 115 | End region |
| 12 | Region of low current density |
| 120 | Bore, threaded hole |
| 19 | Remainder of the coil |
| 190 | Recess for coil bridge |
| 20 | Threaded bolt |
| 30 | Securing wedge |

Although embodiments of the present invention has been described with reference to preferred embodiments, workers skilled in the art will recognize that changes may be made in form and detail without departing from the spirit and scope of the invention.

The invention claimed is:

1. An electromagnetic pulse welding coil comprising:
a first conductive region; and
a second conductive region assigned to a remainder of the coil and having a low current density,
wherein:
the first conductive region is configured for generating a higher current density than the second conductive region;
the first conductive region is detachably connected to the remainder of the coil using a detachable connection;
the electromagnetic pulse welding coil is planar in design and is cut out of a metal plate;
the first conductive region is shaped as an elongated bridge with a transverse, extension that is narrow compared to a longitudinal extension; and
the first conductive region extends parallel to the second conductive region.

2. The electromagnetic pulse welding coil according to claim 1, wherein the first conductive region, which is designed as a bridge, comprises a broadened end region, by which it is connected to the remainder of the coil.

3. The electromagnetic pulse welding coil according to claim 1, wherein the detachable connection comprises:
screws or threaded bolts inserted through unthreaded bores in the first conductive region and the remainder of the coil and tightened by means of counter nuts;
screws or threaded bolts that are screwed into a threaded hole that is formed in the first conductive region or the remainder of the coil; and/or
an end region of the first conductive region that plugs into a complementary recess, which is designed for forming a planar contact between two parts of the remainder of the coil.

4. The electromagnetic pulse welding coil according to claim 1, wherein a lateral extension of a U-shaped outline of the remainder of the coil is larger than a transverse extension of the first conductive region.

5. The electromagnetic pulse welding coil according to claim 1, wherein the coil has mirror symmetry.

6. The electromagnetic pulse welding coil according to claim 1, wherein the coil has more than one region suitable for generating a higher current density than the current density of the second conductive region.

7. The electromagnetic pulse welding coil according to claim 1, wherein a cross-section of the coil changes continuously in its profile.

8. A method of using the electromagnetic pulse welding coil according to claim 1, comprising:
removing the first conductive region from the remainder of the coil comprising releasing the detachable connection to the first conductive region;
providing a new first conductive region; and
connecting the new first conductive region to the remainder of the coil.

9. A method of using an electromagnetic pulse welding coil comprising:
providing the electromagnetic pulse welding coil comprising:
a first conductive region; and
a second conductive region assigned to a remainder of the coil and having a low current density,
wherein:
the first conductive region is configured for generating a higher current density than the second conductive region;
the first conductive region is detachably connected to the remainder of the coil using a detachable connection;
the electromagnetic pulse welding coil is planar in design and is cut out of a metal plate;
the first conductive region is shaped as an elongated bridge with a transverse extension that is narrow compared to a longitudinal extension; and
the first conductive region extends parallel to the second conductive region;
removing the first conductive region from the remainder of the coil comprising releasing the detachable connection to the first conductive region;
providing a new first conductive region; and
connecting the new first conductive region to the remainder of the coil.

10. The method according to claim 9, wherein the first conductive region of the electromagnetic pulse welding coil, which is designed as a bridge, comprises a broadened end region, by which it is connected to the remainder of the coil.

11. The method according to claim 9, wherein:
the detachable connection comprises:
screws or threaded bolts inserted through unthreaded bores in the first conductive region and the remainder of the coil and tightened by means of counter nuts;
screws or threaded bolts that are screwed into a threaded hole that is formed in the first conductive region or the remainder of the coil; and/or
an end region of the first conductive region that plugs into a complementary recess, which is designed for forming a planar contact between two parts of the remainder of the coil; and
removing the first conductive region comprises removing the screws or threaded bolts or removing the end region from the complementary recess.

12. The method according to claim 9, wherein a lateral extension of a U-shaped outline of the remainder of the coil is larger than a transverse extension of the first conductive region.

13. The method according to claim 9, wherein the coil has mirror symmetry.

14. The method according to claim 9, wherein the coil has more than one region suitable for generating a higher current density than the current density of the second conductive region.

15. The method according to claim 9, wherein a cross-section of the coil changes continuously in its profile.

* * * * *